Sept. 28, 1943.  G. F. ARCHER  2,330,325
EXPLOSIVE-CARRIER SENSITIVE TO AIRPLANE INDUCED AERIAL DISTURBANCES
Filed June 19, 1939

INVENTOR
George F. Archer
BY
Frederick W. Barker
ATTORNEY

Patented Sept. 28, 1943

2,330,325

UNITED STATES PATENT OFFICE 2,330,325

EXPLOSIVE-CARRIER SENSITIVE TO AIRPLANE INDUCED AERIAL DISTURBANCES

George F. Archer, New York, N. Y.

Application June 19, 1939, Serial No. 279,796

1 Claim. (Cl. 102—4)

This invention relates to anti-aircraft shells and other explosive-carriers and my improvements are directed to means enabling such shells and carriers to explode under and through the influence of abnormal atmospheric conditions such as are created within a limited surrounding area by an airplane in flight.

Bombing aircraft when at high altitudes present targets upon which direct hits are not easily made from the surface and the purpose of my invention is to provide means whereby a shell or the like containing a high explosive, such for example as TNT, may be caused to explode when in an area or zone occupied by the aircraft, the proximity of the explosion entailing destruction of the aircraft.

The aerial disturbances which I refer to as abnormal atmospheric conditions, created by an airplane in flight, are various and my anti-aircraft shell or carrier is equipped with firing mechanism responsive thereto. The propeller slip streams and the wake following the airplane, constitute actuating impulses relied upon by me for co-action with responsive instrumentalities upon the shell or carrier for the discharge of its explosive.

While without definite knowledge as to the extent of the area, surrounding an airplane in flight, which circumscribes the disturbed aerial condition, it at any rate considerably enlarges the target zone in which a discharged high explosive will prove effective, and that is the main object of the present invention.

Other features and advantages of my invention will hereinafter appear.

The aerial disturbances created by an airplane in flight, whether in the form of propeller slip streams, the wake following the airplane, or the sound waves created by the propellers and engine exhausts, may in my opinion all come under the general classification of fugitive air waves, which designation is employed in the claim language.

I have provided an explosive-carrier that is dropped from above an airplane, to fall through an area surrounding the airplane sufficiently near for the aerial disturbances set up by such airplane to react upon the sensitive firing devices with which the explosive-carrier is equipped for the discharge of the explosive.

The explosive-carrier may be dropped from aircraft operating at a higher altitude than the enemy airplane to be attacked, such aircraft being equipped if desired with suitable sighting and directing instrumentation, as is known in bomb sighting. In order to retard the speed of descent the explosive-carrier may be supported by a relatively small parachute, and it is this parachute which, in passing the enemy airplane, will be tilted by the pressure of the fugitive waves from the airplane. This tilting of the parachute, by means of a pivotal mercury-containing cup to which it is connected, will cause the firing circuit to be closed and thus the explosive discharged.

Figure 1:
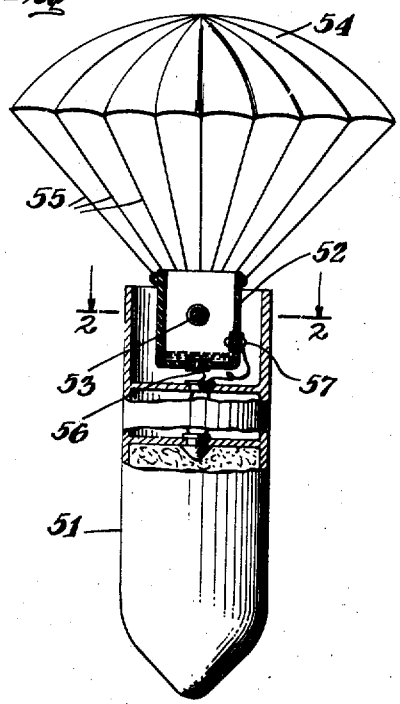
Fig. 1 is a side elevation, partly in section, of an explosive-container that is to be let fall from an elevation above an enemy aircraft and provided with descent speed-retarding means.
Figure 2:
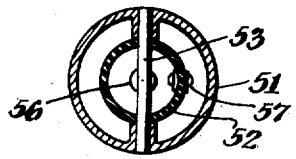
Fig. 2 is a section on the line 2—2 of Fig. 1.

Thus, in Fig. 1 I have shown an explosive-carrier 51, in whose upper portion a mercury-containing cup 52 is mounted as by a transverse pivot 53, a parachute 54 being extended from the carrier as by strands 55—here shown for example as connected to the cup 52. The pivotal mount of cup 52 enables it to rotate as the parachute, coming abreast of the enemy airplane will be tilted by the encountered fugitive air waves whereupon the mercury in the cup will close the electrical circuit through the contacts 56, 57. It is to be understood that the carrier houses a source of electrical energy such as a battery.

It is, of course, to be understood that a shell equipped with my improvement may also be provided with the usual war nose for its discharge in the event of a direct hit, but such device, being known in the art, is not herein shown.

This carrier obviously could be provided with the conventional safety devices to prevent explosion until the carrier is successfully launched. Obviously this would be necessary if it should be desired to launch or drop the bomb from fast moving aircraft.

My invention herein illustrated and described has its genesis in the principle adopted by me wherein the aerial disturbances created by an airplane in flight provide the motivating means for setting off a high explosive that is delivered from another aircraft to fall within the area of aerial disturbance created by the target.

Variations within the spirit and scope of my invention are equally comprehended by the foregoing disclosure.

I claim:

A drop bomb comprising a body part, an explosive charge therein, means including an electric circuit means and a detonator associated with the explosive charge to detonate the same, a container pivoted to said body part, a parachute connected to said container normally to hold said container in a stable condition, a conducting fluid medium in said container, contact means on said container forming part of said electric circuit means, said fluid medium serving to complete the electric circuit, including the detonator when the parachute is tilted by fugitive air waves caused by passing objects and the container tilted out of stable condition whereby the said charge will be exploded.

GEORGE F. ARCHER.